(12) United States Patent
Whittingham

(10) Patent No.: US 8,332,114 B2
(45) Date of Patent: Dec. 11, 2012

(54) BRAKING SYSTEM FOR AN AIRCRAFT AND A METHOD OF MONITORING BRAKING FOR AN AIRCRAFT

(75) Inventor: Andrew Whittingham, Coventry (GB)

(73) Assignee: Meggitt Aerospace Ltd. (GB)

( * ) Notice: Subject to any disclaimer, the term of this patent is extended or adjusted under 35 U.S.C. 154(b) by 740 days.

(21) Appl. No.: 12/516,829

(22) PCT Filed: Nov. 8, 2007

(86) PCT No.: PCT/GB2007/004246
§ 371 (c)(1),
(2), (4) Date: Oct. 2, 2009

(87) PCT Pub. No.: WO2008/065335
PCT Pub. Date: Jun. 5, 2008

(65) Prior Publication Data
US 2010/0057320 A1 Mar. 4, 2010

(30) Foreign Application Priority Data
Nov. 29, 2006 (GB) .................................. 0623804.2

(51) Int. Cl.
*G06F 19/00* (2006.01)
*G06G 7/76* (2006.01)

(52) U.S. Cl. .......... 701/70; 701/119; 303/126; 303/121; 244/111

(58) Field of Classification Search .................. 244/111; 701/70, 119; 303/126, 121, 122, 155, 9.61, 303/122.09
See application file for complete search history.

(56) References Cited

U.S. PATENT DOCUMENTS
3,926,479 A * 12/1975 Bissell et al. ............ 303/122.04
(Continued)

FOREIGN PATENT DOCUMENTS
EP 1637422 3/2006
GB 2346184 7/2011

OTHER PUBLICATIONS
The acceleration stress test of the brake system on an airplane; Jianjun Qiao; Reliability, Maintainability and Safety (ICRMS), 2011 9th International Conference on; Digital Object Identifier: 10.1109/ICRMS.2011.5979426; Publication Year: 2011 , pp. 1067-1072.*

(Continued)

*Primary Examiner* — Cuong H Nguyen
(74) *Attorney, Agent, or Firm* — Renner Kenner Greive Bobak Taylor & Weber

(57) ABSTRACT

A braking system (1) for an aircraft which includes a by-pass control system (9) for activation when undemanded braking or loss of braking is detected. The braking system (1) comprises: a brake pedal transducer (2) for generating a brake pedal actuation signal when a brake pedal (3) is applied; brake actuation means (5) for activating a brake (6) on receipt of a braking signal; braking pressure transducer means (7) for generating a braking output signal related to the braking force applied to the brake (6); primary processing means (4) in electrical communication with the brake pedal transducer (2) and the brake actuation means (5) and adapted to generate a braking signal on receipt of a brake pedal actuation signal; secondary processing means (8) adapted to receive the brake pedal actuation signal and braking output signal; and a bypass braking control system (9) adapted to receive the brake pedal actuation signal from the brake pedal transducer (2) and generate a braking signal in response to the brake pedal actuation signal. The secondary processing means (8) is adapted to disable the primary processing means (4) and enable the bypass braking control system (9) on detection of undemanded braking or loss of braking from the brake pedal actuation signal and braking output signal.

15 Claims, 2 Drawing Sheets

U.S. PATENT DOCUMENTS

Figure 1:
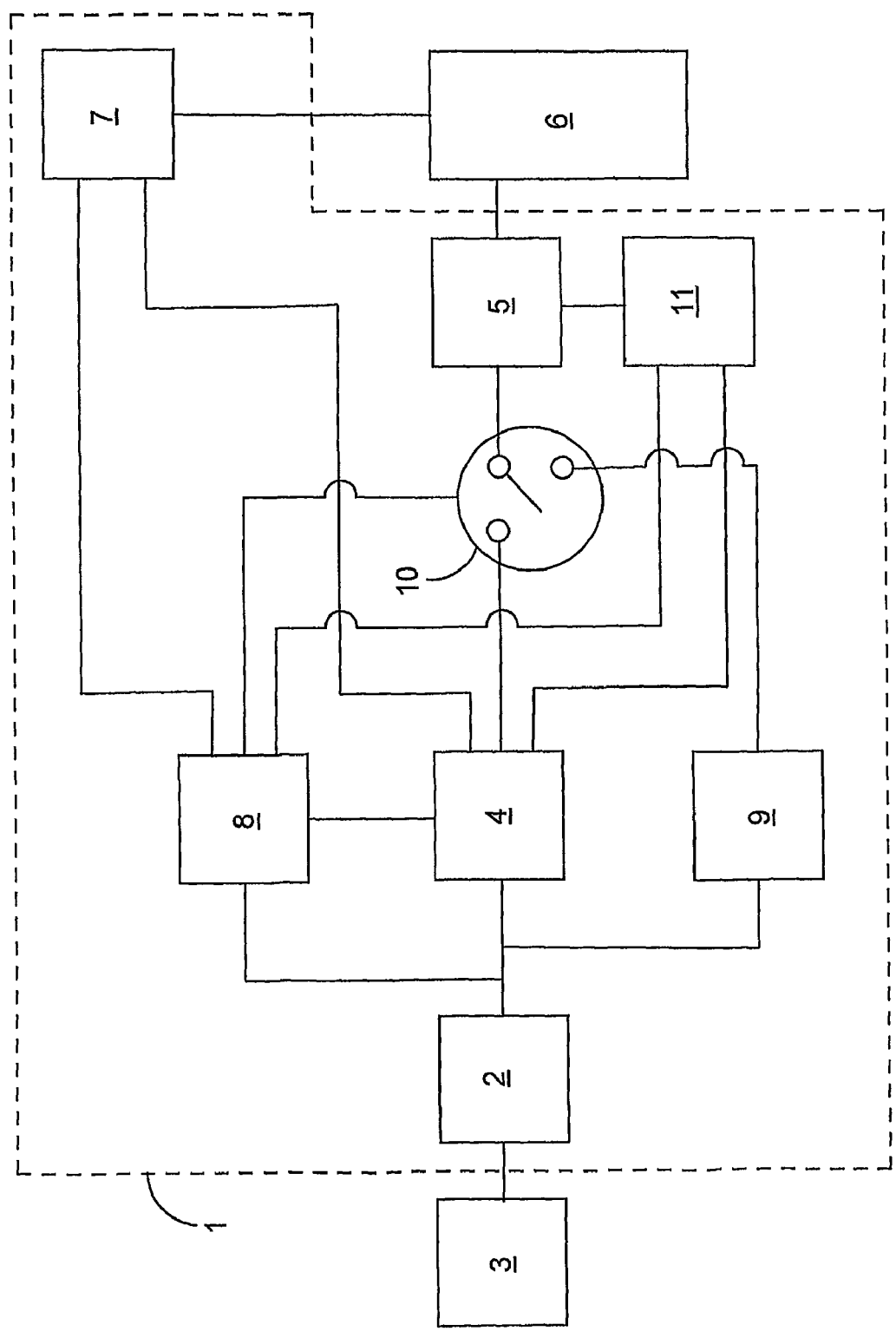

| | | | |
|---|---|---|---|
| 5,000,521 A * | 3/1991 | Majima et al. ................. 303/122 |
| 6,134,956 A | 10/2000 | Salamat et al. |
| 6,183,051 B1 * | 2/2001 | Hill et al. ...................... 303/126 |
| 6,390,571 B1 | 5/2002 | Murphy |
| 6,513,885 B1 * | 2/2003 | Salamat et al. .......... 303/122.09 |
| 6,820,946 B2 * | 11/2004 | Salamat et al. .......... 303/122.09 |
| 7,093,696 B2 * | 8/2006 | Quitmeyer et al. .......... 188/71.1 |
| 2001/0045771 A1 | 11/2001 | Corio et al. |
| 2003/0111895 A1 * | 6/2003 | Salamat et al. ............. 303/9.61 |
| 2004/0239173 A1 | 12/2004 | Williams et al. |
| 2005/0189814 A1 | 9/2005 | Mallevais et al. |
| 2008/0154470 A1 * | 6/2008 | Goranson et al. ............... 701/70 |
| 2008/0258547 A1 * | 10/2008 | Ralea et al. ................... 303/122 |
| 2008/0258548 A1 * | 10/2008 | May et al. ..................... 303/139 |
| 2009/0276133 A1 * | 11/2009 | May et al. ...................... 701/75 |
| 2010/0070150 A1 * | 3/2010 | May ............................... 701/71 |
| 2010/0280725 A1 * | 11/2010 | Cahill ............................ 701/70 |
| 2011/0198163 A1 * | 8/2011 | Hanlon et al. ............... 188/72.8 |
| 2011/0214496 A1 * | 9/2011 | Cahill ............................ 73/121 |

OTHER PUBLICATIONS

Anti-Lock and Anti-Slip Braking System, using fuzzy logic and sliding mode controllers; Naderi, P.; Farhadi, A.; Mirsalim, M.; Mohammadi, T.; Vehicle Power and Propulsion Conference (VPPC), 2010 IEEE; Digital Object Identifier: 10.1109/VPPC.2010.5729058; Publication Year: 2010 , pp. 1-6.*

Regenerative braking for aircraft landing roll phase using an electric machine; Grigore-Muler, O.; Barbelian, M. Optimization of Electrical and Electronic Equipment (OPTIM), 2012 13th International Conference on Digital Object Identifier: 10.1109/OPTIM.2012. 6231843; Publication Year: 2012 , pp. 584-593.*

Implementation of pedal feeling for Brake by Wire system using bilateral control; Harsha, A.M.; Abeykoon, S.; Ohnishi, K. Industrial Electronics, 2008. ISIE 2008. IEEE International Symposium on; Digital Object Identifier: 10.1109/ISIE.2008.4677132 Publication Year: 2008 , pp. 1347-1352.*

* cited by examiner

BRAKING SYSTEM FOR AN AIRCRAFT AND A METHOD OF MONITORING BRAKING FOR AN AIRCRAFT

The present invention relates to a braking system for an aircraft and also a method for monitoring braking for an aircraft. More particularly, but not exclusively, the present invention relates to a braking system having a by-pass braking control system which is activated when braking loss or undemanded braking is detected.

Braking systems in aircraft have become increasingly complex. Typically a computer is used to monitor brake pedal displacement and to provide a braking signal to a brake actuator to apply pressure to brakes. The microprocessor adjusts the braking signal to avoid skidding. A dangerous failure mode for such systems is when the microprocessor requests braking without the brake pedal being pressed.

U.S. Pat. No. 6,134,956 describes a hardware monitor which detects such undemanded braking and then closes a shut off valve to the brake actuator means, resulting in no brakes. Whilst such a system is useful when the aircraft is taking off it is of little use when the aircraft is taxiing where sudden loss of braking may result in loss of control of the aircraft.

The present invention seeks to overcome this problem.

Accordingly, in the first aspect, the present invention provides a braking system for an aircraft comprising:

a brake pedal transducer for generating a brake pedal actuation signal when a brake pedal is applied;

brake actuation means for activating a brake on receipt of a braking signal;

braking pressure transducer means for generating a braking output signal related to the braking force applied to the brake;

primary processing means in electrical communication with the brake pedal transducer and the brake actuation means and adapted to generate a braking signal on receipt of a brake pedal actuation signal;

secondary processing means adapted to receive the brake pedal actuation signal and braking output signal; and a bypass braking control system adapted to receive the brake pedal actuation signal from the brake pedal transducer and generate a braking signal in response to the brake pedal actuation signal;

the secondary processing means being adapted to disable the primary processing means and enable the bypass braking control system on detection of undemanded braking or loss of braking from the brake pedal actuation signal and braking output signal.

The braking system according to the invention has the advantage that on detecting loss of braking or undemanded braking the system switches to a bypass braking control system which allows control of the aircraft to be maintained.

Preferably the secondary processing means detects a loss of braking by comparing the braking output signal to a predetermined level on receipt of a brake pedal actuation signal.

The brake actuation means can comprise a servo valve.

The secondary processing means can comprise a Field Programmable Gate Array (FPGA).

The bypass braking control system can be adapted to generate a braking signal related to the pedal position.

Preferably, the braking bypass control system comprises an integrator to ramp the braking signal in response to a change in the brake pedal actuation signal.

Preferably, the brake pedal transducer is adapted to generate a validity signal on detection of a fault in the transducer, the secondary processing means being adapted to disable at least one of undemanded braking or loss of braking detection on receipt of the validity signal.

Preferably, the primary and secondary processing means are adapted to detect faults in at least one of the brake pedal actuation signal and braking output signal.

The braking system can further comprise a shut off valve adapted to turn off the brake actuation means.

Preferably, the primary processing means is adapted to receive the braking output signal and to activate the shut off valve on detection of undemanded braking.

Preferably, the primary processing means is adapted to set the braking signal to turn off the brake actuation means and to disable braking loss detection in the secondary processing means on detection of undemanded braking.

Preferably, the secondary processing means is adapted to open the shut off valve on enabling the bypass braking control system.

In an alternative aspect of the invention there is provided a system for monitoring the braking system for an aircraft, the braking system for an aircraft comprising:

a brake pedal transducer for generating a brake pedal actuation signal when a brake pedal is applied;

brake actuation means for activating a brake on receipt of a braking signal;

braking pressure transducer means for generating a braking output signal related to the braking force applied to the brake;

primary processing means in electrical communication with the brake pedal transducer and the brake actuation means and adapted to generate a braking signal on receipt of a brake pedal actuation signal;

the system for monitoring the braking system for the aircraft comprising a secondary processing means adapted to receive the brake pedal actuation signal and braking output signal; and a braking bypass control system adapted to receive the brake pedal actuation signal from the brake pedal transducer and generate a braking signal in response to the brake pedal actuation signal; and the secondary processing means being adapted to disable the primary processing means and enable the bypass braking control system on detection of undemanded braking or loss of braking from the brake pedal actuation signal and braking output signal.

In a further aspect of the invention there is provided a method for monitoring braking for an aircraft having a braking system, the braking system comprising:

a brake pedal transducer for generating a brake pedal actuation signal when a brake pedal is applied;

brake actuation means for activating a brake on receipt of a braking signal;

braking pressure transducer means for generating a braking output signal related to the braking force applied to the brake;

primary processing means in electrical communication with the brake pedal transducer and the brake actuation means and adapted to generate a braking signal on receipt of a brake pedal actuator signal in response to the brake pedal actuation signal; and a bypass braking control system adapted to receive the brake pedal actuation signal from the brake pedal transducer and generate a braking signal;

the method comprising the steps of:
(a) receiving the brake pedal actuation signal;
(b) receiving the braking output signal; and
(c) disabling the primary processing means and enabling the bypass braking control system a detection of undemanded braking or loss of braking from the brake pedal actuation signal and braking output signal.

Preferably, the method comprises the step of determining undemanded braking from the braking output signal and brake pedal actuation signal, turning off the brake actuation means on determination of undemanded braking and then only disabling the primary processing means and enabling the bypass braking control system if undemanded braking is still determined from the braking output signal.

Figure 2:
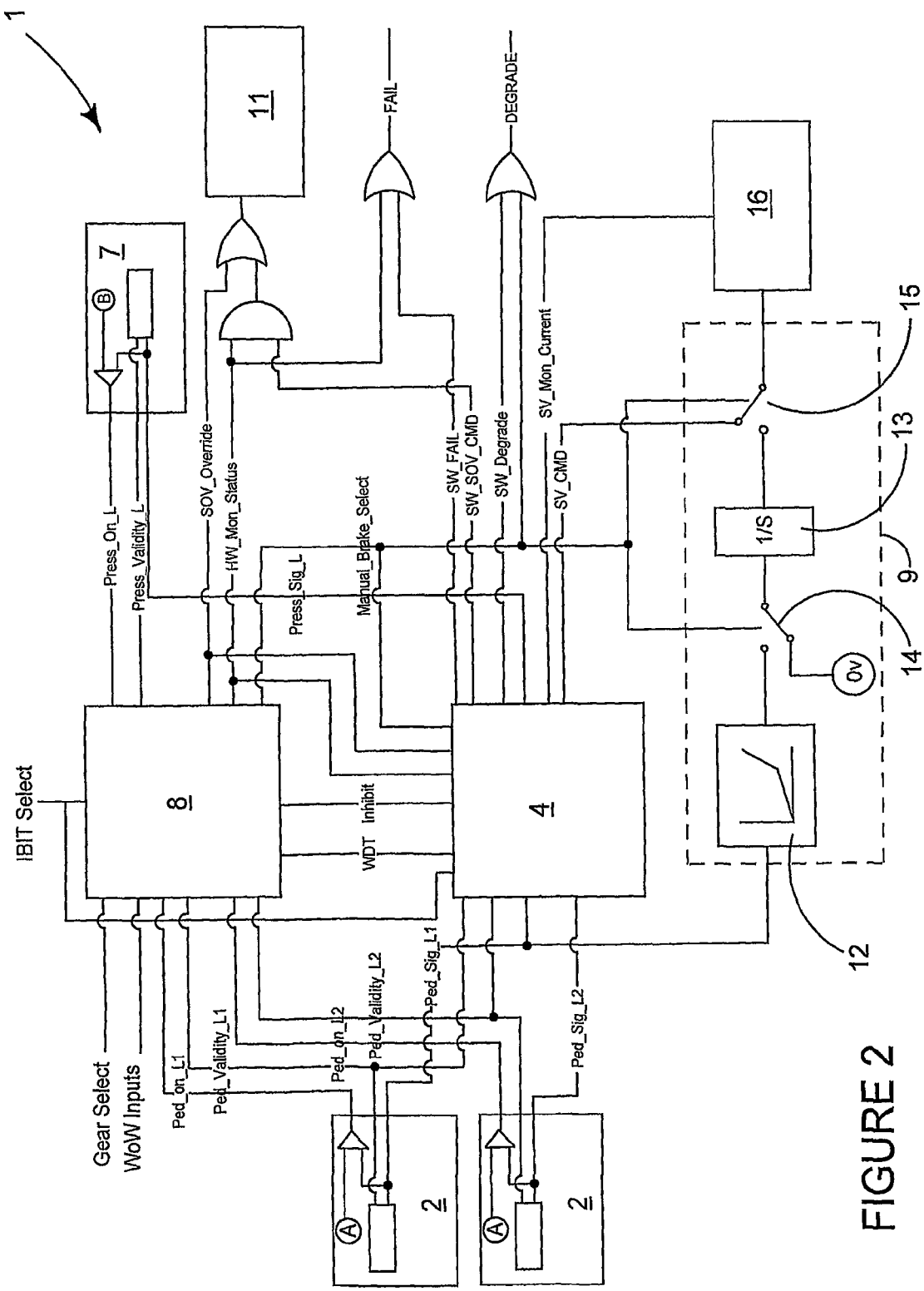

The present invention will now be described by way of example only not in any limitative sense with reference to the accompanying drawings in which:

FIG. 1 shows in schematic form a braking system according to the invention; and, FIG. 2 shows a braking system according to the invention.

Shown in FIG. 1 in schematic form is a braking system 1 according to the invention. The system 1 comprises a brake pedal transducer 2 which generates a brake pedal actuation signal when a connected pedal 3 is displaced. A primary processing means 4 receives the brake pedal actuation signal and outputs a braking signal in response to the brake pedal actuation signal. Software within the primary processing means 4 determines the value of the braking signal, controlling brake skidding. The braking signal is received by brake actuation means 5 which in turn applies a braking force to the brake 6 slowing the aircraft. The system 1 further comprises a pressure transducer 7 which generates a braking output signal related to the force applied to the brake.

The system further comprises a secondary processing means 8. The secondary processing means 8 receives the braking output signal from the pressure transducer 7 and also the brake pedal actuation signal. A bypass braking control system 9 is connected between the brake pedal transducer 2 and the brake actuation means 5 as shown.

In use the secondary processing means 8 monitors the brake pedal actuation signal and braking output signal and checks for undemanded braking or loss of braking. The secondary processing means 8 checks undemanding braking by comparing the braking output signal to a predetermined value when the brake pedal 3 is not pressed. It checks for loss of braking by comparing the braking output signal to a further predetermined value. In alternative embodiments more complex schemes for determining loss of braking or undemanded braking are possible. For example the predetermined values used for comparison could vary with brake pedal actuation signal.

On detecting undemanded braking or loss of braking the secondary processing means 8 activates a switch 10 which disables the primary processing means 4 (in the sense that it is no longer able to send signals to the brake actuation means) and enables the bypass braking control system 9, so allowing the pilot to maintain control over braking.

The primary processing means 4 is also able to take corrective action if a fault is detected. One possible failure is in the brake actuation means 5 resulting in undemanded braking. This could happen for example if the brake actuation means 5 is a servo valve which can be become stuck in the open position. The primary processing means 4 receives the braking output signal from the pressure transducer 7. On detecting undemanded braking the primary processing means 4 closes a shut off valve 11 preventing the actuation means 5 from applying further pressure to the brake. The braking signal is also set to zero. When the braking system 1 is in this state with the shut off valve 11 closed pressing the brake pedal 3 will not result in a change in a pressure applied to the brake 6. The primary processing means 4 therefore disables loss of braking detection by the secondary processing means 8 in order to avoid the secondary processing means 8 from erroneously detecting a loss of braking. The primary processing means 4 disables the loss of braking detection of the secondary processing means 8 before the secondary processing means 8 is able to respond to a detected loss of braking.

Closing the shut off valve 11 may cause the braking system 1 to return to a normal state. However, if there is a fault in the pressure transducer 7, even if the brake actuation means 5 returns to a normal state the braking output signals may still remain high. The secondary processing means 8 will detect this as undemanded braking and activate the bypass braking control system 9. As the shut off valve 11 has already been closed by the primary processing means 4 the secondary processing means 8 will override this and open the shut off valve 11 when actuating the bypass braking control system 9.

Shown in FIG. 2 is a further embodiment of a braking system 1 according to the invention. In this embodiment the primary processing means 4 comprises a DSP chip which receives the brake pedal activation signal and generates a braking signal (on SV_CMD) based on internal software. The secondary processing means 8 is an FPGA. In addition to the function as described with reference to FIG. 1, the FPGA 8 also performs a watchdog timer function (WDT). Signals from the DSP 4 are sent to the FPGA 8 on the WDT line. The FPGA 8 checks that the DSP software is correctly controlling loop time and also checks for valid address and data accesses. Failure of the watchdog timer is also used to invoke the bypass mode.

The embodiment of FIG. 2 is shown with two pedal transducers 2. Each of the pedal transducers 2 provides a brake pedal actuation signal to the FPGA 8 and DSP 4 on lines Ped_Sig_L1 and Ped_Sig_L2. The brake pedal transducers 2 are able to provide internal fault detection. The brake pedal transducers 2 provide validity signals to the DSP 4 and FPGA 8 to indicate if a fault exists in these transducers 2.

The DSP 4 also includes software to identify faults in the brake pedal transducers 2. In this embodiment each brake pedal 3 is fitted with two sensors to indicate movement on the brake pedal 3. The DSP 4 can identify such faults and correct for them.

FIG. 2 shows only one bypass braking control system 9 for convenience. In practice each brake pedal 3 will have an associated bypass braking control system 9. The bypass braking control system 9 is an electromechanical system comprising a control element 12 which converts the input brake actuation signal to an output braking signal. The control element 12 can be arranged such that the braking signal is a non-linear function of the brake pedal actuation signal. This provides some sensitivity for the pilot. For example, depressing the pedal 75% of its travel applies about 30% of the available pressure to the brakes with the remaining 70% being applied in the final 25% of the brake pedal travel.

The bypass braking control system 9 also includes an integrator 13 to ramp the braking signal. This avoids any sudden application of the brakes if the pilot has his feet on the brake pedals 3 when the bypass braking control system 9 is activated, i.e. in loss of braking conditions.

On detection of a failure the FPGA 8 activates the bypass braking control system 9 and disables the DSP 4 by means of switches 14, 15.

The brake actuation means 5 of this embodiment is a servovalve of which only the servo-valve interface 16 is shown. The normal failure mode for undemanded braking is when the servo-valve 5 becomes stuck open. As with the previous embodiment on detection of undemanded braking the DSP 4 closes the shut off valve 11, sets the braking signal to zero and disables the loss of braking detection in the FPGA 8. The DSP 4 also generates a FAIL signal to alert the pilot. If the signal from the pressure transducer 7 remains high the FPGA 8 detects undemanded braking and enables the bypass braking control system 9 and generates a DEGRADE/Antiskid fail signal. With DEGRADE/Antiskid fail the pilot would take care with braking. If the pilot suspects loss of braking the emergency braking system is still available.

The pressure transducer 7 of the embodiment of FIG. 2 is also able to detect internal faults and provide a validity signal to the FPGA 8.

The undemanded and loss of braking checks for the FPGA 8 of the embodiment of FIG. 2 can be inhibited for a predetermined period of time if pre-retract braking or Initiated Built In Test (IBIT) conditions are detected by examining inputs from weight on wheels (WOW) sensors (not shown) and from a gear select monitor (not shown). IBIT may also be initiated via a dedicated line provided to the FPGA 8 and DSP 4 for testing purposes. The FPGA 8 is also intelligent enough to inhibit the undemanded and/or loss of braking checks if the input transducers are failed.

The hardware monitor 8 functionality will be verified during the development of the FPGA (8). Checks on the associated hardware, analogue switches/SOV logic etc are checked at power up of the system. The hardware monitor 8 outputs HW_Mon_Status and Manual_Brake_Select are initialised in an unlatched fail state, the unlatched fail state is cleared by the first valid write to the watchdog timer when the software completes its initialisation phase. The SOV override signal needs to power up in a false state to prevent any inadvertent pressure application should the pilot apply the brakes during the initialisation phase. The PBIT will involve checking the status of the 3 hardware monitor outputs (HW_Mon_Status, SOV_Override and Manual_Brake_Select) the software also checks the SOV_Status signal to confirm it is off. The software then zeros SV_CMD signal and checks that the SV_Mon_Current feedback current is indicating a level of approx. 3 mA—this will verify that the analogue switches/ relays have successfully selected the bypass mode. The software guards against the pilot applying pedals 3 whilst the feedback current check is operating.

The invention claimed is:

1. A braking system for an aircraft comprising:
   a brake pedal transducer for generating a brake pedal actuation signal when a brake pedal is applied;
   brake actuation means for activating a brake on receipt of a braking signal;
   braking pressure transducer means for generating a braking output signal related to the braking force applied to the brake;
   primary processing means in electrical communication with the brake pedal transducer and the brake actuation means and adapted to generate a braking signal on receipt of a brake pedal actuation signal;
   secondary processing means adapted to receive the brake pedal actuation signal and braking output signal; and
   a bypass braking control system adapted to receive the brake pedal actuation signal from the brake pedal transducer and generate a braking signal in response to the brake pedal actuation signal;
   the secondary processing means being adapted to disable the primary processing means and enable the bypass braking control system on detection of undemanded braking or loss of braking from the brake pedal actuation signal and braking output signal.

2. A braking system for an aircraft as claimed in claim 1, wherein the secondary processing means detects a loss of braking by comparing the braking output signal to a predetermined level on receipt of a brake pedal actuation signal.

3. A braking system as claimed in claim 1, wherein the brake actuation means comprises a servo valve.

4. A braking system as claimed in claim 1, wherein the secondary processing means comprises a Field Programmable Gate Array (FPGA).

5. A braking system as claimed in claim 1, wherein the bypass braking control system is adapted to generate a braking signal related to the pedal position.

6. A braking system as claimed in claim 5, wherein the braking bypass control system comprises an integrator to ramp the braking signal in response to a change in the brake pedal actuation signal.

7. A braking system as claimed in claim 1, wherein the brake pedal transducer is adapted to generate a validity signal on detection of a fault in the transducer, the secondary processing means being adapted to disable at least one of undemanded braking or loss for braking detection on receipt of the validity signal.

8. A braking system as claimed in claim 1, wherein the primary and secondary processing means are adapted to detect faults in at least one of the brake pedal actuation signal and braking output signal.

9. A braking system as claimed in claim 1, further comprising a shut off valve adapted to turn off the brake actuation means.

10. A braking system as claimed in claim 9, wherein the primary processing means is adapted to receive the braking output signal and to activate the shut off valve on detection of undemanded braking.

11. A braking system as claimed in claim 10, wherein the primary processing means is adapted to set the braking signal to turn off the brake actuation means and to disable braking loss detection in the secondary processing means on detection of undemanded braking.

12. A braking system as claimed claim 9, wherein the secondary processing means is adapted to open the shut off valve on enabling the bypass braking control system.

13. A system for monitoring the braking system for an aircraft, the braking system for an aircraft comprising:
   a brake pedal transducer for generating a brake pedal actuation signal when a brake pedal is applied;
   brake actuation means for activating a brake on receipt of a braking signal;
   braking pressure transducer means for generating a braking output signal related to the braking force applied to the brake;
   primary processing means in electrical communication with the brake pedal transducer and the brake actuation means and adapted to generate a braking signal on receipt of a brake pedal actuation signal;
   the system for monitoring the braking system for the aircraft comprising
   a secondary processing means adapted to receive the brake pedal actuation signal and braking output signal; and
   a braking bypass control system adapted to receive the brake pedal actuation signal from the brake pedal transducer and generate a braking signal in response to the brake pedal actuation signal; and
   the secondary processing means being adapted to disable the primary processing means and enable the bypass braking control system on detection of undemanded braking or loss of braking from the brake pedal actuation signal and braking output signal.

14. A method for monitoring braking for an aircraft having a braking system, the braking system comprising:
- a brake pedal transducer for generating a brake pedal actuation signal when a brake pedal is applied;
- brake actuation means for activating a brake on receipt of a braking signal;
- braking pressure transducer means for generating a braking output signal related to the braking force applied to the brake;
- primary processing means in electrical communication with the brake pedal transducer and the brake actuation means and adapted to generate a braking signal on receipt of a brake pedal actuator signal; and
- a bypass braking control system adapted to receive the brake pedal actuation signal from the brake pedal transducer and generate a braking signal in response to the brake pedal actuation signal;

the method comprising the steps of:
- (a) receiving the brake pedal actuation signal;
- (b) receiving the braking output signal; and
- (c) disabling the primary processing means and enabling the bypass braking control system on detection of undemanded braking or loss of braking from the brake pedal actuation signal and braking output signal.

15. A method as claimed in claim 14, wherein the method comprises the step of determining undemanded braking from the braking output signal and brake pedal actuation signal, turning off the brake actuation means on determination of undemanded braking and then only disabling the primary processing means and enabling the bypass braking control system if undemanded braking is still determined from the braking output signal.

* * * * *